United States Patent
Gill et al.

(10) Patent No.: US 7,464,246 B2
(45) Date of Patent: Dec. 9, 2008

(54) SYSTEM AND METHOD FOR DYNAMIC SIZING OF CACHE SEQUENTIAL LIST

(75) Inventors: Binny Sher Gill, San Jose, CA (US); Dharmendra Shantilal Modha, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 214 days.

(21) Appl. No.: 10/954,937

(22) Filed: Sep. 30, 2004

(65) Prior Publication Data

US 2006/0069871 A1    Mar. 30, 2006

(51) Int. Cl.
*G06F 12/00* (2006.01)

(52) U.S. Cl. .................. 711/173; 711/136; 711/170

(58) Field of Classification Search ............. 711/173, 711/136, 170
See application file for complete search history.

(56) References Cited

U.S. PATENT DOCUMENTS

| | | | |
|---|---|---|---|
| 5,761,715 A * | 6/1998 | Takahashi | 711/128 |
| 6,141,731 A | 10/2000 | Beardsley et al. | 711/136 |
| 6,260,115 B1 * | 7/2001 | Permut et al. | 711/134 |
| 6,327,644 B1 | 12/2001 | Beardsley et al. | 711/136 |
| 2003/0105928 A1 | 6/2003 | Ash et al. | 711/136 |
| 2004/0098541 A1 | 5/2004 | Megiddo et al. | 711/129 |

OTHER PUBLICATIONS

ARC: A Self-Tuning, Low Overhead Replacement Cache by Megiddo & Modha; USENIX File & Storage Tech. Conf.; Mar. 31, 2003, San Francisco, CA.

IBM Dossier ARC920020050; Method and System for Adaptive Replacement Cache; Modha and Megiddo, Jan. 29, 2003.

* cited by examiner

*Primary Examiner*—Sanjiv Shah
*Assistant Examiner*—Jae U Yu
(74) *Attorney, Agent, or Firm*—John L. Rogitz

(57) ABSTRACT

A self-tuning, low overhead, simple to implement, locally adaptive, novel cache management policy that dynamically and adaptively partitions the cache space amongst sequential and random streams so as to reduce read misses.

4 Claims, 4 Drawing Sheets

Example Architecture

Compute Marginal Utility of Adding Space to SEQ

(e.g., = $\frac{s}{L}$ to $\frac{2s}{L}$ )

38

Empirically Determine Marginal Utility of Adding Space to Random (e.g. $1/\Delta L$ in Adaptive Interval)

40

Utility of SEQ > Utility of Random ?  42

Y → Increase desired Size of SEQ  44

N → Decrease desired Size of SEQ  46

Logic for establishing Desired Size

Fig. 3

SYSTEM AND METHOD FOR DYNAMIC SIZING OF CACHE SEQUENTIAL LIST

FILED OF THE INVENTION

The present invention relates generally to data caching.

BACKGROUND

Caching is a fundamental technique in hiding delays in writing data to and reading data from storage, such as hard disk drive storage. These delays can be referred to as input/output (I/O) latency. Because caching is effective in hiding I/O latency, it is widely used in storage controllers, databases, file systems, and operating systems.

A cache thus may be defined as a high speed memory or storage device that is used to reduce the effective time required to read data from or write data to a lower speed memory or device. A modern storage controller cache typically contains volatile memory used as a read cache and a non-volatile memory used as a write cache. The effectiveness of a read cache depends upon its "hit" ratio, that is, the fraction of requests that are served from the cache without necessitating a disk trip (which represents a "miss" in finding data in the cache). The present invention is focused on improving the performance of a read cache, i.e., increasing the hit ratio or equivalently minimizing the miss ratio.

Typically, cache is managed in uniformly sized units called pages. So-called demand paging requires a page to be copied into cache from the slower memory (e.g., a disk) only in the event of a cache miss of the page, i.e., only if the page was required by the host and it could not be found in cache, necessitating a relatively slower disk access. In demand paging, cache management is relatively simple, and seeks to intelligently select a page from cache for replacement when the cache is full and a new page is to be stored in cache owing to a "miss". One well-known policy simply replaces the page whose next access is farthest in the future with the new page. Another policy (least recently used, or LRU) replaces the least recently used page with the new page.

As recognized herein, in addition to demand paging, further improvement can be made in hiding I/O latency by speculatively prefetching or prestaging pages. Relatively complex algorithms have been introduced which attempt to predict when a page will be needed, but commercial systems have rarely used very sophisticated prediction schemes, because sophisticated prediction schemes require an extensive history to be kept of page accesses. This is cumbersome and expensive. Furthermore, to be effective a prefetch must complete before the predicted request, requiring sufficient prior notice that may not be feasible to attain. Also, long-term predictive accuracy may be low to begin with and can become worse with interleaving of a large number of different workloads. Finally, for a disk subsystem operating near its peak capacity, average response time increases drastically with the increasing number of disk fetches, and, hence, low accuracy predictive prefetching which results in an increased number of disk fetches can in fact worsen the performance.

Accordingly, the present invention understands that a simpler approach to speculative prefetching can be employed that uses the principle of sequentiality, which is a characteristic of demanded data (data to be read) in which consecutively numbered pages in ascending order without gaps are often required. Sequential file access arises in many contexts, including video-on-demand, database scans, copy, backup, and recovery. In contrast to sophisticated forecasting methods, as understood herein detecting sequentiality is easy, requiring very little history information, and can attain nearly 100% predictive accuracy.

However, while seemingly simple, a good sequential prefetching algorithm and associated cache replacement policy, as critically recognized herein, is surprisingly difficult to achieve. To understand why, it must first be understood that in sequential prefetching, synchronous prefetching (bringing into cache sequential pages to a missed page) may be used initially, and after this bootstrapping stage, asynchronous prefetching (bringing into cache pages that are sequential to a demanded "trigger" page that was "hit", i.e., found in cache) is used. Prefetching and caching thus are intertwined, and one policy for cache management when prefetch is used is the above-mentioned LRU in which two lists, one listing sequential pages and one listing random access pages, are maintained according to recency of access. In the context of sequential prefetching, when tracks are prefetched or accessed, they are placed at the most recently used (MRU) end of the sequential list, while for cache replacement, tracks are evicted from the LRU end of the list.

With the above background in mind, the present invention critically observes that when synchronous and asynchronous prefetching strategies are used along with the LRU-based caching, and an asynchronous trigger track is accessed, an asynchronous prefetch of the next group of tracks occurs. In an LRU-based cache, these newly fetched group of tracks along with the asynchronous trigger track are placed at the MRU end of the list, with the unaccessed tracks within the current prefetch group remaining where they were in the LRU list, hence, potentially near the LRU end of the list. These unaccessed tracks within the current prefetch group can be accessed before the tracks in the newly prefetched group, so that, depending upon the amount of cache space available for sequential data, it can happen that some of these unaccessed tracks may be evicted from the cache before they are accessed, resulting in a sequential miss. Furthermore, the present invention understands that this may happen repeatedly, thus defeating the purpose of employing asynchronous prefetching.

Hence, when LRU-based caching is used along with the above prefetching strategy, the resulting algorithm can violate the so-called stack property, and as a result, when the amount of cache space given to sequentially prefetched data increases, sequential misses do not necessarily decrease. As understood herein, the "stack" property can be a crucial ingredient in proper cache management. As further understood herein, at the cost of increasing sequential misses, both of the above problems can be hidden if (i) only synchronous prefetching is used or (ii) if both synchronous and asynchronous prefetching are used, setting the asynchronous trigger to always be the last track in a prefetched group, but of course the first approach amounts to foregoing all potential benefits of asynchronous prefetching, while the second approach can result in a sequential miss if the track being prefetched is accessed before it is in the cache. In view of the above problems, one purpose of the present invention is to avoid violation of the stack property without incurring additional sequential misses. More generally, the present invention represents a significant improvement in cache management when sequential prefetch is used.

SUMMARY OF THE INVENTION

A general purpose computer is programmed according to the inventive steps herein. The invention can also be embodied as an article of manufacture—a machine component— that is used by a digital processing apparatus and which tangibly embodies a program of instructions that is executable by the digital processing apparatus to execute the present logic. This invention may be realized in a critical machine component that causes a digital processing apparatus to perform the inventive method steps herein.

Accordingly, a method for caching data includes maintaining a random data list and a sequential data list, and dynamically establishing a desired size for the sequential data list.

In some embodiments, the establishing act can include determining whether a least recently used (LRU) portion of the sequential data list is more valuable in terms of cache misses than a least recently used (LRU) portion of the random list and if so, increasing the desired size, otherwise decreasing the desired size. In specific embodiments the method includes computing a marginal utility of adding space to the sequential data list in terms of sequential misses, and empirically determining a marginal utility of adding space to the random data list. Based on the computing and determining acts, the desired size of the sequential data list is established.

The computing act can determine the marginal utility to be equal to a number between s/L and 2 s/L, inclusive, wherein s represents the rate of sequential misses for synchronous and asynchronous prefetching and L represents the length of the sequential data list. Also, the empirically determining act may include determining the number of sequential misses between two successive cache hits in the bottom $\Delta L$ portion of the random data list. The desired size is increased if the computed marginal utility of adding space to the sequential data list exceeds the empirically determined marginal utility of adding space to the random data list, and otherwise is decreased. If desired, the method may further include moving at least one newly prefetched group of tracks along with an asynchronous trigger track in the group of tracks to a most recently used (MRU) portion of the sequential data list. Also, the method may include moving at least some unaccessed tracks in the group of tracks to the MRU portion of the sequential data list. Also, if desired the method may include determining whether the size of at least a portion of the sequential data list exceeds the desired size, and replacing at least one cache element, based thereon.

In another aspect, a data system is disclosed that uses a least recently used (LRU) caching scheme which in turn uses synchronous and asynchronous prefetch of data from a data storage device. The system avoids violation of stack property substantially without incurring additional sequential misses from cache.

In yet another aspect, a computer program product includes means for computing a marginal utility of adding space to a sequential list of a cache in terms of sequential misses. Means are also provided for empirically determining a marginal utility of adding space to a random list in cache. The computer program product has means for, responsive to the computing and determining means, establishing a desired size of the sequential list.

In still another aspect, in a processor that is associated with at least one cache having a sequential list and a random list, with both lists defining respective least recently used (LRU) portions each of which is associated with a respective marginal utility that changes during operation, logic is provided which includes, during operation, attempting to equalize the marginal utilities.

In another aspect, a processor is associated with a cache for executing logic to move a newly prefetched group of tracks along with an asynchronous trigger track in the group of tracks to a most recently used (MRU) portion of a sequential cache list. The logic also moves unaccessed tracks in the group of tracks to the MRU portion of the sequential cache list.

In yet another aspect, a processor associated with a cache executes logic for determining whether the size of a sequential cache list exceeds a desired size, and based thereon, replacing at least one cache element.

The details of the present invention, both as to its structure and operation, can best be understood in reference to the accompanying drawings, in which like reference numerals refer to like parts, and in which:

BRIEF DESCRIPTION OF THE DRAWINGS

FIG. 3 is a flow chart of the cache size management logic; and

DETAILED DESCRIPTION OF THE PREFERRED EMBODIMENT

Figure 1:
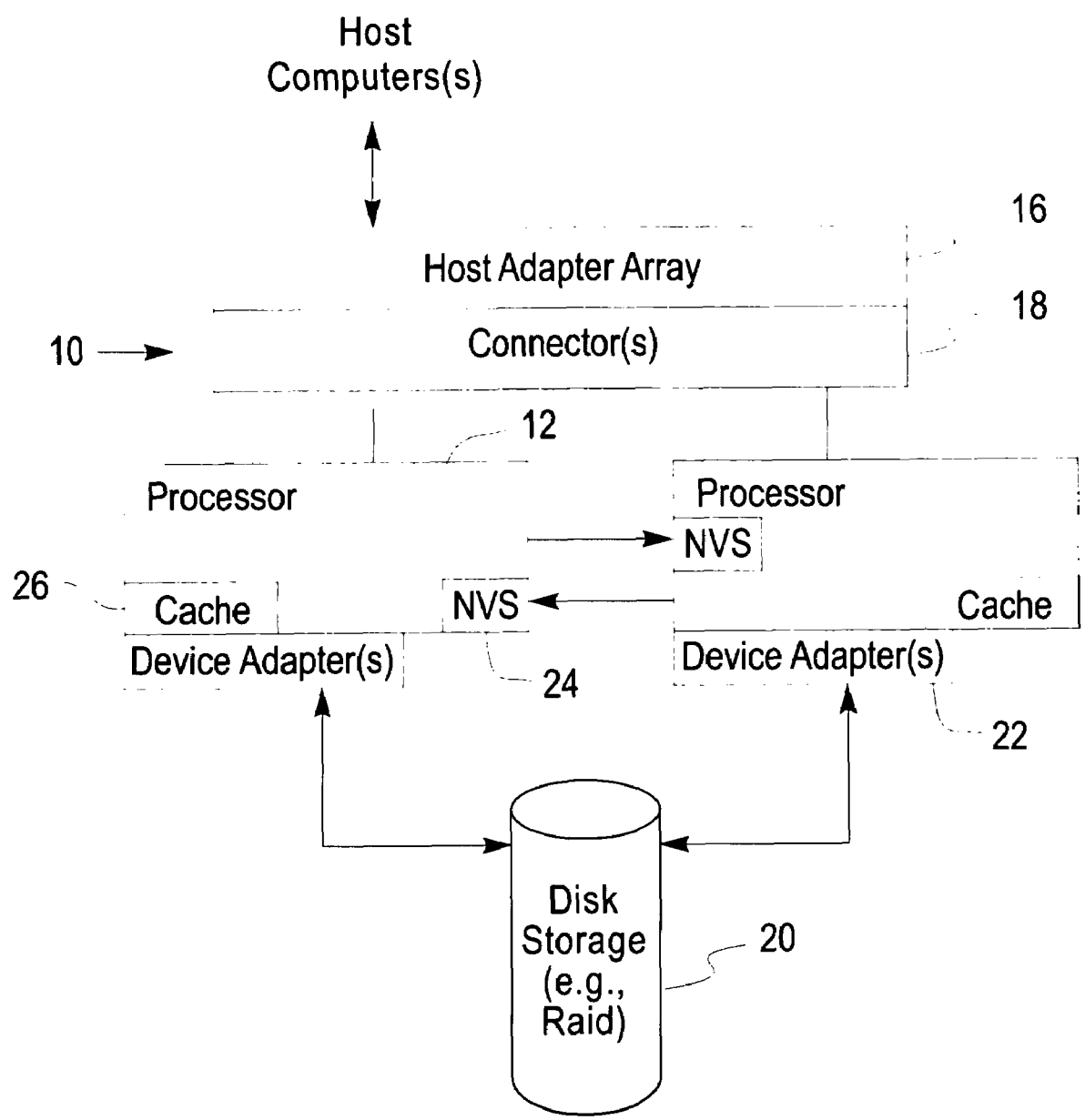
FIG. 1 is a block diagram of one non-limiting system in which the present cache management policy can be used.

Referring initially to FIG. 1, a system is shown, generally designated 10, that illustrates one non-limiting environment in which the present invention can be used. In general, the present invention is a system for managing a data cache that caches data from a slower memory. For instance, the present invention may be implemented in database systems such as DB2 and Oracle, as well as RAID-based systems such as the present assignee's "Shark" system, as well as other systems, such as individual hard disk drives, etc. Accordingly, it is to be understood that while FIG. 1 illustrates one non-limiting implementation that has a "Shark" architecture, it is but representative of the environments that the present invention finds use. Thus, the present invention may be implemented in a file system, database system, or other system that must allocate space for variable-sized data objects. In one intended embodiment, the processor or processors (computers) of the present invention may be personal computers made by International Business Machines Corporation (IBM) of Armonk, N.Y., or any computers, including computers sold under trademarks such as AS400, with accompanying IBM Network Stations.

As shown, one or more processors 12 may communicate with one or more host computers 14 through an array 16 of host adapters with associated connectors 18. Also, the processor or processors 12 may communicate with slower storage, such as a RAID-configured disk storage system 20, through respective device adapters 22. The processors 12 may have respective non-volatile storages (NVS) 24 for receiving communication from the other processor, as well as a respective, preferably solid state implemented, data cache 26. One or both processors are programmed to execute the logic herein.

With respect to this logic, the flow charts and pseudo code herein illustrate the structure of the present logic executed by the processor(s) 12 as embodied in computer program software. Those skilled in the art will appreciate that the flow charts and pseudo code illustrate the structures of logic elements, such as computer program code elements or electronic logic circuits, that function according to this invention. Manifestly, the invention is practiced in its essential embodiment by a machine component that renders the logic elements in a form that instructs a digital processing apparatus (that is, a computer) to perform a sequence of function steps corresponding to those shown.

In other words, the flow charts and/or pseudo code may be embodied in a computer program that is executed by a processor as a series of computer-executable instructions. These instructions may reside, for example, in a program storage device of the system 10. The program storage device may be RAM, or a magnetic or optical disk or diskette, DASD array, magnetic tape, electronic read-only memory, or other appropriate data storage device. In an illustrative embodiment of the invention, the computer-executable instructions may be lines of compiled C/C++ compatible code.

In the non-limiting implementation shown, each cache 26 has a capacity of eight gigabytes (GB) (per cluster), each NVS 24 has a capacity of two GB (per cluster), four 600 MHz PowerPC/RS64IV CPUs (per cluster) may be used, and sixteen RAID-5 (6+parity+spare) arrays with 72 GB, 10K rpm drives may be used in the data storage 20. An AIX computer can implement the host computer 14 with the following configuration: sixteen GB RAM, two-way SMP with one GHz PowerPC/Power4 CPUs. The host computer 14 may be connected to the processors 12 through two fiber channel cards implementing the host adaptor array 16.

Figure 2:
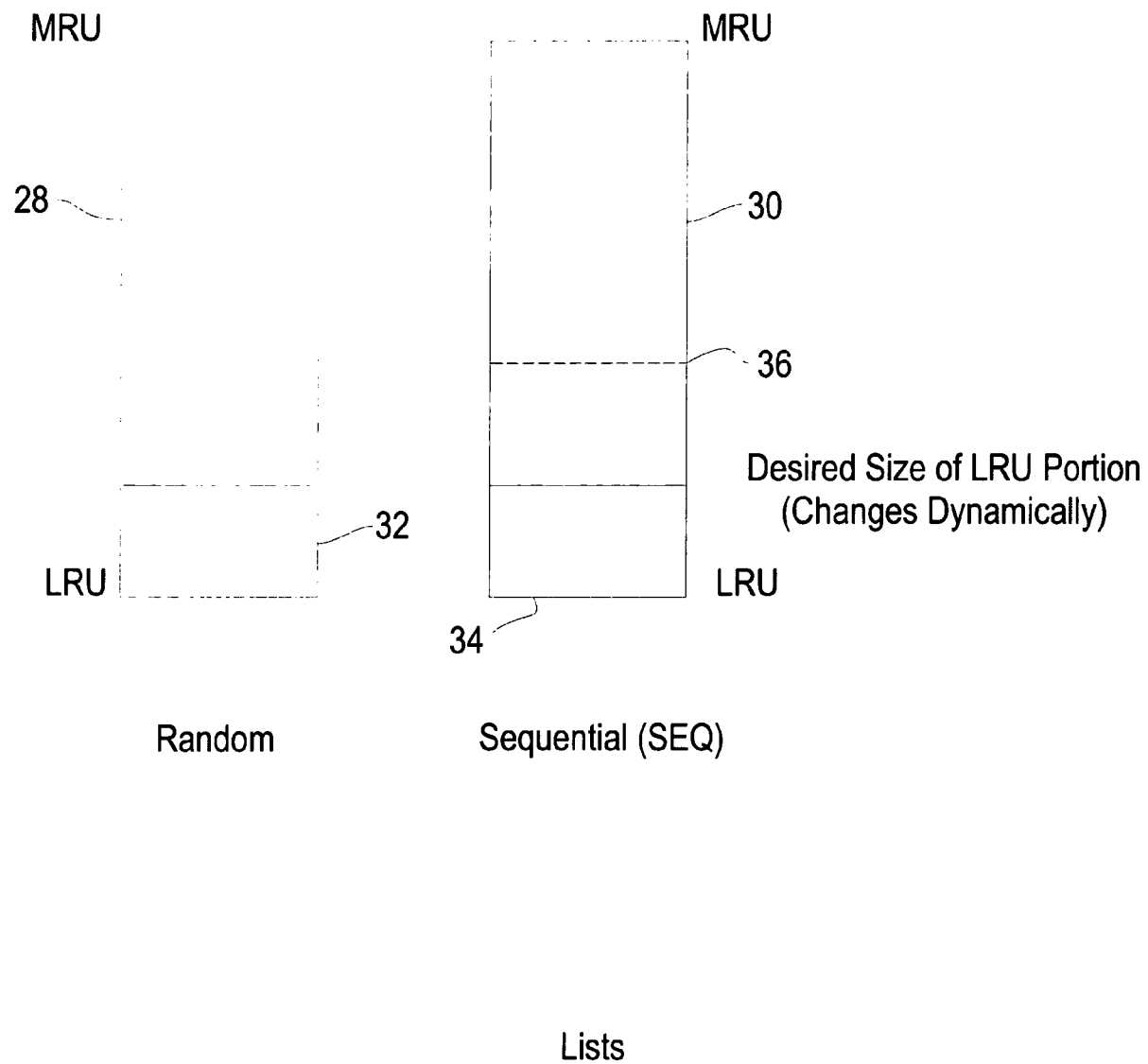
FIG. 2 is a schematic illustration of the random page list and sequential page list in cache.

Now referring to FIG. 2, each cache 26 may include two stacked lists, namely, a RANDOM list 28 and a sequential ("SEQ") list 30. The random list 28 lists cached pages that may have been randomly accessed pursuant to, e.g., a read demand, while the SEQ list 30 maintains a list of pages that were cached pursuant to speculative sequential caching or sequential read demands, the principles of which are set forth herein. At the top of each list 28, 30 is its most recently used (MRU) page, while at the bottom of the list is the least recently used (LRU) page. A respective portion 32, 34 of each list at its bottom, e.g., 2%, can be thought of as an LRU portion. With respect to the SEQ list 30, a desired size 36 of its LRU portion is dynamically determined and adjusted in accordance with the logic set forth below, to optimize cache performance.

Preferably, as in a conventional LRU-based cache, a newly prefetched group of tracks along with the asynchronous trigger track in the current group of tracks are placed at the MRU (top) end of the SEQ list 30. Additionally, in accordance with present principles all unaccessed tracks in the current group of tracks are also moved to the MRU end of the list 30, to retain the benefits of asynchronous prefetching while ridding it of the anomalous behavior noted above.

Now referring to FIG. 3, the inventive adaptive, self-tuning, low overhead algorithm of the present invention is shown for dynamically partitioning the amount of cache space among the SEQ list 30 and RANDOM list 28 to minimize the overall miss rate. Commencing at block 38, the marginal utility of adding space to the SEQ list 30 is computed. In one illustrative non-limiting embodiment the marginal utility at block 38 is computed to be between s/L and 2 s/L, and may be chosen for convenience to be the latter, wherein "s" represents the rate of misses from sequential cache for synchronous and asynchronous prefetching and "L" represents the length of the SEQ list 30 (e.g., in 4 KB pages). In one embodiment, "s" is the sum over potentially multiple streams of the respective rates of sequential cache misses for synchronous and asynchronous prefetching, which is straightforward to observe. This "marginal utility" may be regarded as a measure of how the rate of sequential cache misses changes as the size of the list changes.

FIG. 3, block 40 shows that the marginal utility of adding space to the RANDOM list 28 is also determined empirically.

In one illustrative non-limiting embodiment this marginal utility is determined to be $1/\Delta L$, wherein $\Delta L$ is the length of the bottom-most portion of the RANDOM cache 28 during a time period defined by two successive cache hits in the bottom-most portion of the random list 28. Thus, the time period for sampling for undertaking the empirical determination at block 40 may itself be adapted to actual operating conditions, although some fixed time period may also be used.

Once the two marginal utilities discussed above have been obtained, the logic flows to decision diamond 42 to determine which marginal utility is greater. If the marginal utility of increasing the SEQ cache exceeds the marginal utility of increasing the RANDOM cache, the logic increases the desired size 36 (FIG. 2) of the SEQ list 30 at block 44; otherwise, it decreases the desired size 36 at block 46.

Figure 4:
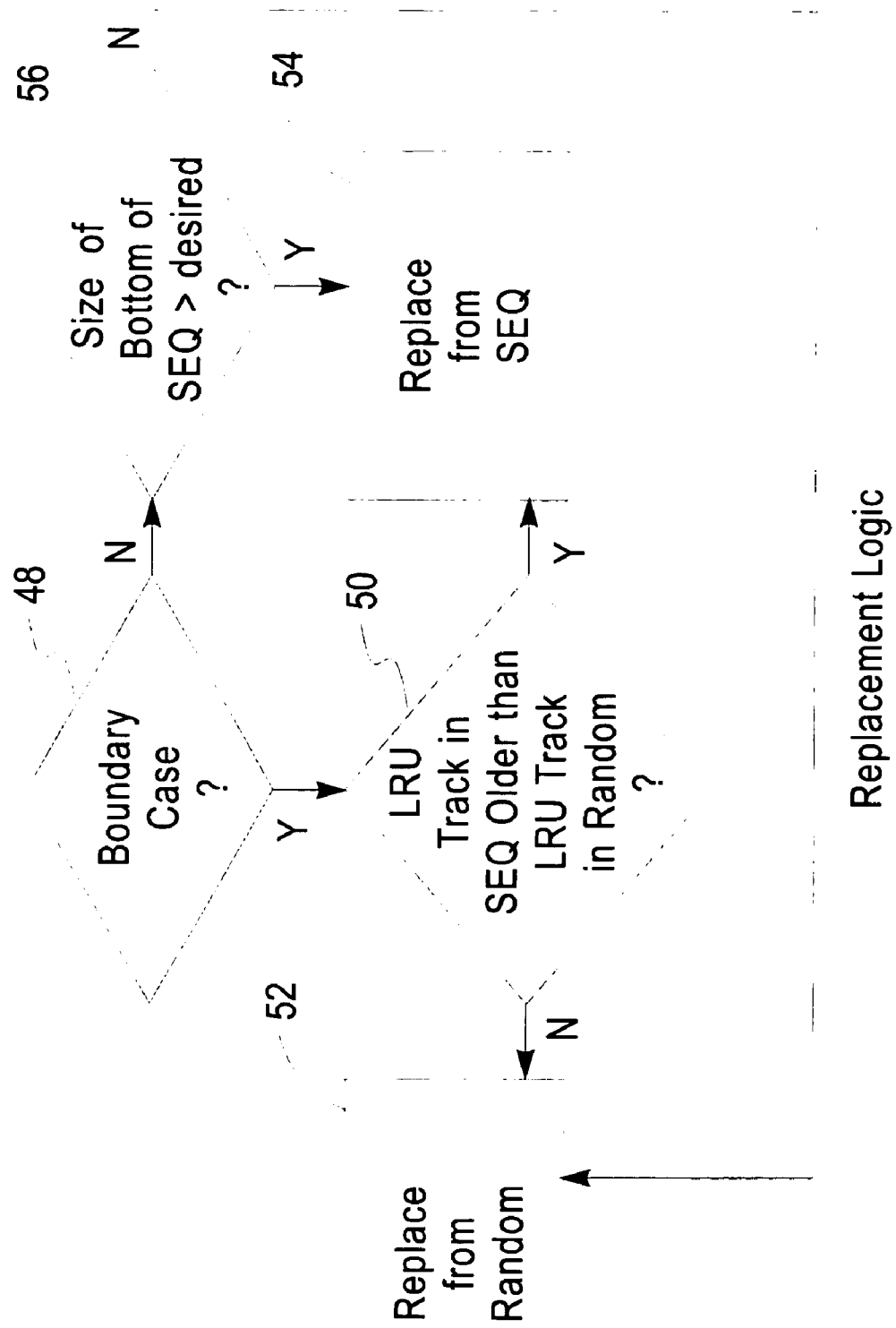
FIG. 4 is a flow chart of the cache replacement logic.

FIG. 4 shows an exemplary non-limiting logic flow for replacing pages in cache. Commencing at decision diamond 48, it can be determined whether a boundary condition exists. Non-limiting examples of boundary conditions include the RANDOM list 28 falling below 2% or exceeding 98% of overall cache size. Another boundary condition may exist if the initialization shown in the pseudocode below has not been executed.

If a boundary condition exists, the logic can flow to decision diamond 50 to determine whether the LRU track in the SEQ list 30 is older than the LRU track in the RANDOM list 28, it being understood that this test uses timestamps given to cached data in accordance with principles known in the art. If the test at decision diamond 50 is negative, the logic replaces a page from the RANDOM list 28 at block 52; otherwise, it replaces from the SEQ list 30 at block 54.

If a boundary condition does not exist, however, the logic flows to decision diamond 56 to determine whether the size of at least a portion of the SEQ list 30, e.g., the LRU portion 34 shown in FIG. 2, exceeds the desired size 36. If it does, the logic flows to block 54, and otherwise flows to block 52.

The logic shown in FIG. 3 continuously or periodically loops back to block 38, such that the desired size of the LRU portion of the SEQ list 30 is dynamically established during operation, changing as cache use dictates.

The pseudo code below is self explanatory, but by way of further elucidation, it is determined if a hit in one of the lists was actually in its LRU portion $\Delta L$, lines 6 and 12. Thus, if TMRU and TLRU denote the time stamp of the MRU and LRU tracks, respectively, in SEQ, L denotes the size of SEQ in pages, and THIT denotes the time stamp of the hit track, then if $(THIT-TLRU) \leq \Delta L/L \ (TMRU-TLRU)$, a bottom hit has occurred. The same calculation can also be used for determining the bottom hits in RANDOM.

The code below uses three constants, which may be particular to a specific implementation an hence are non-limiting: (i) "m" (lines 18 and 32) denotes the degree of synchronous and asynchronous read-ahead; (ii) "g" (lines 18 and 32) denotes the number of disks in a RAID group when the invention is implemented in a RAID device; and (iii) "triggeroffset" (line 49) is the offset from the end of a prefetched group of tracks and is used to demarcate the asynchronous trigger.

Lines 1-3 are used during the initialization phase only. The counter "seqmiss" tracks the number of sequential misses between two consecutive bottom hits in RANDOM, and is initialized to zero. The variable "desiredSeqListSize" is the desired size 36 of the SEQ list 30, and is initially set to zero meaning a boundary condition initially exists. The remaining logic thus starts only after SEQ is populated (see lines 69-73). The variable "adapt" determines the instantaneous magnitude and direction of the adaptation to desiredSeqListSize.

Lines 4-50 describe the cache management policy. The quantity ratio in line 4 can be set to (2*s*ΔL)/L in some non-limiting embodiments.

Lines 5-10 deal with the case when a track in RANDOM is hit. If the hit is in the bottom portion of the RANDOM list (line 6), then "seqmiss" is reset to zero (line 7) since the number of sequential misses between two successive hits in the bottom of RANDOM is of interest. Line 8 sets the variable "adapt"={2·seqmiss·ΔL}/L−1. However, "adapt" is not allowed to exceed 1 or be less than −1. Observe that if "adapt" is greater than zero, then desiredSeqListSize is preferably increased, else it is preferably decreased. This increase or decrease is executed in line 70. Also, when the inequality between the marginal utilities of SEQ and RANDOM is larger, the magnitude of "adapt" is larger, and, hence, a faster rate of adaptation is adopted, whereas when the two marginal utilities are nearly equal, "adapt" will be close to zero, and a slower rate of adaptation is adopted. Finally, line 70 (which carries out the actual adaptation) is executed only when a track is actually evicted from one of the lists.

Lines 11-27 deal with the case when a track in SEQ is hit. If the hit is in the bottom portion of the SEQ list (line 12) and "ratio" has become large (line 13), in other words, no hit has been observed in the bottom of the RANDOM list for a while, then "adapt" is set to 1 (line 14) meaning that "desiredSeqListSize" is increased at the fastest rate possible. If the hit track is an asynchronous trigger track (line 17), then line 18 asynchronously reads ahead the next sequential group of tracks. Lines 21-27 describe the implementation of a non-limiting way to detect sequential access patterns.

Lines 28-40 deal with a cache miss. For a sequential miss (lines 29-31), a group of tracks is synchronously read-ahead at line 32. The remaining lines deal with the detection of sequential access patterns.

Lines 41-50 (i) read the missing tracks from a given range of tracks; (ii) places all tracks in the given range at the MRU position; and (iii) set the asynchronous trigger. Lines 51-73 implement the cache replacement policy of FIG. 4 above and execute out the adaptation. As is typical in multithreaded systems, the present invention assumes that these lines may run on a separate thread (line 51). If the size of the free queue drops below some predetermined threshold (line 52), then tracks are evicted from SEQ if it exceeds desiredSeqListSize and tracks are evicted from RANDOM otherwise. In either case, the evicted tracks are placed on the free queue. Finally, lines 68-73 evict the LRU track from the desired list, and effect an adaption as described above.

```
INITIALIZATION: Set the adaptation variables to 0
1:   Set seqMiss to 0
2:   Set "adapt" to 0
3:   Set desiredSeqListSize to 0
CACHE MANAGEMENT POLICY:
Track x is requested:
4:   Set ratio = (2 • seqMiss • ΔL) /seqListSize
5:   case i: x is an element of RANDOM (HIT)
6:      if x is an element of RANDOM BOTTOM then
7:         Reset seqMiss = 0
8:         Set "adapt" = max( −1, min(ratio − 1, 1) )
9:      endif
10:     Mru(x, RANDOM)
11:  case ii: x is an element of SEQ (HIT)
12:     if x is an element of SEQ BOTTOM then
13:        if (ratio > 20) then
14:           Set "adapt" = 1
15:        endif
16:     endif
17:     if x is AsyncTrigger then
18:        ReadAndMru([x + 1, x + m − x%g], SEQ)
19:     endif
20:     Mru(x, SEQ)
21:     if track (x − 1) is an element of (SEQ union with RANDOM)
        then
22:        if (seqCounter(x − 1) == 0) then
23:           Set seqCounter(x) = max (seqThreshold,
              seqCounter(x − 1) + 1)
24:        endif
25:     else
26:        Set seqCounter(x) = 1
27:     endif
28:  case iii: x is not an element of (SEQ union with RANDOM) (MISS)
29:     if (x − 1) is an element of (SEQ union with RANDOM) then
30:        if seqCounter(x − 1) == seqThreshold then
31:           seqMiss++
32:           ReadAndMru([x, x + m − x%g], SEQ)
33:           Set seqCounter(x) = seqThreshold
34:        else
35:           ReadAndMru( [x, x], RANDOM)
36:           Set seqCounter(x) = seqCounter(x − 1) + 1
37:        endif
38:     else
39:        Set seqCounter(x) = 1
40:     endif
ReadAndMru( [start, end], listType )
41: foreach track t in [start, end]; do
42:     if t is not an element of (SEQ union with RANDOM) then
43:        grab a free track from FreeQ
44:        read track t from disk
45:     endif
46:     Mru(t, listType)
47: done
48: if (listType == SEQ)
49:     Set AsyncTrigger as (end − triggerOffset)
50: endif
FREE QUEUE MANAGEMENT:
FreeQThread( )
51: while (true) do
52:    if length(FreeQ) < FreeQThreshold then
53:       if(seqListSize < ΔL or randomListSize < ΔL) then
54:          If (lru track of SEQ is older than lru track of RANDOM)
             then
55:             EvictLruTrackAndAdapt(SEQ)
56:          else
57:             EvictLruTrackAndAdapt(RANDOM)
58:          endif
59:       else
60:          if (seqListSize > desiredSeqListSize) then
61:             EvictLruTrackAndAdapt(SEQ)
62:          else
63:             EvictLruTrackAndAdapt(RANDOM)
64:          endif
65:       endif
66:    endif
67: endwhile
EvictLruTrackAndAdapt( listType )
68: evict lru track in listType and add it to FreeQ
69: if (desiredSeqListSize > 0) then
70:    Set desiredSeqListSize += "adapt" / 2
71: else
72:    Set desiredSeqListSize = seqListSize
73: endif
```

In summary, the present invention combines caching along with sequential prefetching, and does not require a history to be kept.

While the particular SYSTEM AND METHOD FOR DYNAMIC SIZING OF CACHE SEQUENTIAL LIST as herein shown and described in detail is fully capable of attaining the above-described objects of the invention, it is to be understood that it is the presently preferred embodiment of the present invention and is thus representative of the subject matter which is broadly contemplated by the present invention, that the scope of the present invention fully encompasses other embodiments which may become obvious to those skilled in the art, and that the scope of the present invention is accordingly to be limited by nothing other than the appended claims, in which reference to an element in the singular is not intended to mean "one and only one" unless explicitly so stated, but rather "one or more". It is not necessary for a device or method to address each and every problem sought to be solved by the present invention, for it to be encompassed by the present claims. Furthermore, no element, component, or method step in the present disclosure is intended to be dedicated to the public regardless of whether the element, component, or method step is explicitly recited in the claims. Absent express definitions herein, claim terms are to be given all ordinary and accustomed meanings that are not irreconcilable with the present specification and file history.

What is claimed is:

1. A method for caching data, comprising:
  maintaining a random data list and a sequential data list;
  dynamically establishing a desired size for the sequential data list, wherein the establishing act comprises:
  empirically determining a marginal utility of adding space to the random data list;
  computing a marginal utility of adding space to the sequential data list in terms of a rate of sequential misses; and
  based on the computing and determining acts, establishing the desired size of the sequential data list, wherein the empirically determining act comprises determining a rate "s" of sequential misses as the number of sequential misses during a time period defined by two successive cache hits in a bottom portion $\Delta L$ of the random data list, wherein the computing act determines the marginal utility to be equal to a number between $s/L$ and $2\,s/L$, inclusive, wherein s represents a rate of sequential misses for synchronous and asynchronous prefetching and L represents the length of the sequential data list.

2. The method of claim 1, wherein the act of establishing the desired size of the sequential data list comprises:
  increasing the desired size if the computed marginal utility of adding space to the sequential data list exceeds the empirically determined marginal utility of adding space to the random data list, and otherwise decreasing the desired size.

3. The method of claim 1, comprising:
  moving at least one newly prefetched group of units of data along with an asynchronous trigger unit of data in the group of units of data to a most recently used (MRU) portion of the sequential data list; and
  moving at least some unaccessed units of data in the group of units of data to the MRU portion of the sequential data list.

4. The method of claim 1, comprising:
  determining whether the size of at least a portion of the sequential data list exceeds the desired size; and
  replacing at least one cache element, based on the act of determining whether the size of at least a portion of the sequential data list exceeds the desired size.

* * * * *